US008898229B2

(12) United States Patent
Harvey et al.

(10) Patent No.: US 8,898,229 B2
(45) Date of Patent: Nov. 25, 2014

(54) CONTACT MANAGEMENT SYSTEM AND METHOD

(75) Inventors: John Andrew Harvey, New York, NY (US); George Richard Black, Jersey City, NJ (US); Michael Joseph Catchpole, Upper Montclair, NJ (US); Richard H. Mai, Brooklyn, NY (US); Gerald John McCormack, Southport, CT (US); Aiko Muro, New York, NY (US); Dante R. Sarigumba, Monmouth Junction, NJ (US); George Tierney, Fairfield, CT (US)

(73) Assignee: Barclays Capital Inc., New York, NY (US)

( * ) Notice: Subject to any disclaimer, the term of this patent is extended or adjusted under 35 U.S.C. 154(b) by 1448 days.

(21) Appl. No.: 11/414,107

(22) Filed: Apr. 28, 2006

(65) Prior Publication Data

US 2006/0247962 A1    Nov. 2, 2006

Related U.S. Application Data

(60) Provisional application No. 60/676,052, filed on Apr. 29, 2005.

(51) Int. Cl.
*G06F 15/16* (2006.01)
*G06Q 10/10* (2012.01)

(52) U.S. Cl.
CPC ............ *G06Q 10/107* (2013.01); *G06Q 10/109* (2013.01); *G06Q 10/10* (2013.01)
USPC ........................................................ 709/204

(58) Field of Classification Search
USPC ................................ 705/10, 26, 9, 1; 709/204
See application file for complete search history.

(56) References Cited

U.S. PATENT DOCUMENTS

| 4,162,610 | A | * | 7/1979 | Levine ............................. 368/41 |
| 4,548,510 | A | * | 10/1985 | Levine ............................. 368/10 |
| 4,626,836 | A | * | 12/1986 | Curtis et al. .................. 345/156 |
| 5,197,000 | A | * | 3/1993 | Vincent ............................. 705/8 |
| 5,737,726 | A | * | 4/1998 | Cameron et al. .................. 705/7 |

(Continued)

FOREIGN PATENT DOCUMENTS

WO    0186566    11/2001

OTHER PUBLICATIONS

First Office Action for Canadian Patent Application No. 2,610,458, dated Sep. 30, 2010, 4 pages.
International Preliminary Report on Patentability for PCT/US2006/016704 dated Nov. 8, 2007, 7 pages.

(Continued)

*Primary Examiner* — Rupal Dharia
*Assistant Examiner* — Robert B McAdams
(74) *Attorney, Agent, or Firm* — Morgan Lewis & Bockius LLP

(57) ABSTRACT

A contact management system is described having a first database containing proprietary information and a second database containing public information. Where appropriate, the publicly available information is displayed with the proprietary information to give the user more information about a contact. The multiple relationships provided by the public database allow the user to use both the proprietary and public data to find a relationship with a potential client.

31 Claims, 12 Drawing Sheets

(56) References Cited

U.S. PATENT DOCUMENTS

| | | | |
|---|---|---|---|
| 5,893,073 A * | 4/1999 | Kasso et al. | 705/8 |
| 5,930,764 A * | 7/1999 | Melchione et al. | 705/10 |
| 5,983,200 A * | 11/1999 | Slotznick | 705/26 |
| 6,016,478 A * | 1/2000 | Zhang et al. | 705/9 |
| 6,073,138 A * | 6/2000 | de l'Etraz et al. | 707/748 |
| 6,085,166 A * | 7/2000 | Beckhardt et al. | 705/9 |
| 6,272,074 B1 * | 8/2001 | Winner | 368/10 |
| 6,370,566 B2 * | 4/2002 | Discolo et al. | 709/206 |
| 6,687,678 B1 * | 2/2004 | Yorimatsu et al. | 705/8 |
| 7,127,404 B1 * | 10/2006 | Poon | 705/1 |
| 2003/0055757 A1 | 3/2003 | Pfiffner | |
| 2003/0191772 A1 * | 10/2003 | Schaumann et al. | 707/102 |
| 2003/0225732 A1 | 12/2003 | Chan et al. | |
| 2004/0093234 A1 | 5/2004 | Bondi | |
| 2005/0097571 A1 * | 5/2005 | Uguccioni | 719/318 |

OTHER PUBLICATIONS

International Search Report for PCT/US2006/016704 dated Sep. 5, 2007, 2 pages.

Written Opinion for PCT/US2006/016704 dated Sep. 5, 2007, 6 pages.

1st Office Action for European Patent Application No. 08000045.8, dated Feb. 3, 2011, 5 pages.

Publication of PCT/US2006/016704 dated Nov. 9, 2006, 29 pages.

Office Action for Chinese Patent Application No. 200680021891.2, dated Feb. 20, 2009, 13 pages.

Rejection Decision for Chinese Patent Application No. 200680021891.2, dated Jan. 8, 2010, 15 pages.

EP Search Report for European Patent Application No. 06758881.4, dated Feb. 28, 2011, 4 pages.

* cited by examiner

Fig. 8 ary contact information; a second database containing public contact information; and a client program for receiving client contact data from a user for storage in the first database and displaying contact information to the user wherein the displayed contact information includes information retrieved from the first database and the second database.
CONTACT MANAGEMENT SYSTEM AND METHOD

CROSS-REFERENCE TO RELATED APPLICATIONS

This application claims the benefit of prior filed U.S. provisional application Ser. No. 60/676,052, filed Apr. 29, 2005, which is incorporated herein by reference in its entirety.

BACKGROUND OF THE INVENTION

1. Field of the Invention

The present invention relates to computer implemented systems and methods for managing relationships between a company and its clients.

2. Description of the Related Art

The adage, "it's not what you know but who you know," reflects the fact that humans are social animals and we live in a web of relationships with other humans. Opportunities in all aspects of human activity, especially in business, arise through our web of contacts to other people.

In an example of a known contact management system (CMS), information regarding an employee's contacts is entered into a database that is available only to that employee. In many situations, the employee views his/her contacts as personal property and may not wish to share such information with other employees of the company. Contact management systems, however, exhibit network effects wherein the value of the database grows exponentially as the number of contacts increases. From the perspective of the company, having a combined contact management system containing the contacts of all of its employees increases the value of the CMS and institutionalizes the clients to the company. Therefore, there remains a need for systems and methods of contact management at the enterprise level that fully leverages the network effects of individual contacts.

SUMMARY OF THE INVENTION

One embodiment of the present invention is directed to a contact management system comprising: a client program for receiving client contact data from a user and displaying contact information to the user a first database containing propri- An aspect of the present invention is directed to a system further comprising an appointment program component for receiving meeting data from a user and presenting meeting alerts to the user, the meeting data including a list of attendees, a meeting time, a meeting date, and a client contact. A further aspect is directed to a system wherein the meeting data further includes a link to a meeting pattern, the meeting pattern generating one or more meetings for a future date, the future date specified by a repeat factor and a frequency. A further aspect is directed to a system wherein appointment program component generates a meeting from a meeting pattern and inserts the generated meeting into a calendar of an attendee only if the generated meeting falls within a predetermined future time period. In some aspects, the appointment program component further comprises an alert component, the alert component configured to retrieve current information about the client contact and send the retrieved information to a meeting attendee prior to the meeting. In some aspects, the current information includes a most recent market data of the client contact. In some aspects, the current information includes news about the client contact. In some aspects, the retrieved information is sent to the attendee by email. In some aspects, a history of previous meetings with the client contact is included in the sent information. In another aspect, the appointment software component further comprises a synopsis component, the synopsis component configured to send a reminder to a meeting attendee after a scheduled end of a meeting, the reminder prompting the user to enter a synopsis of the meeting, the synopsis stored by the synopsis component. In another aspect, the appointment software component further comprises a summary component, the summary component configured to generate a report for the user, the generated report indicating a number of meetings with each of the user's clients for a previous time period. In another aspect, the contact program component further comprises an inference component, the inference component configured to automatically ask the user to facilitate an introduction to the user's contact based on a predetermined rule. A further aspect is directed to the system further comprising a referral program component for receiving referral data from a user, presenting a list of potential referrals in response to a query, and tracking referrals made by the user.

BRIEF DESCRIPTION OF THE DRAWINGS

The invention will be described by reference to the preferred and alternative embodiments thereof in conjunction with the drawings in which:

FIG. 3 is a screen shot of a custom contact form used in some embodiments of the present invention;

FIG. 4 is another screen shot of a custom contact form used in some embodiments of the present invention;

FIG. 5 is another screen shot of a custom contact form used in some embodiments of the present invention;

FIG. 6 is another screen shot of a custom contact form used in some embodiments of the present invention;

FIG. 8 is another screen shot of a custom appointment form used in some embodiments of the present invention;

DETAILED DESCRIPTION

Figure 1:
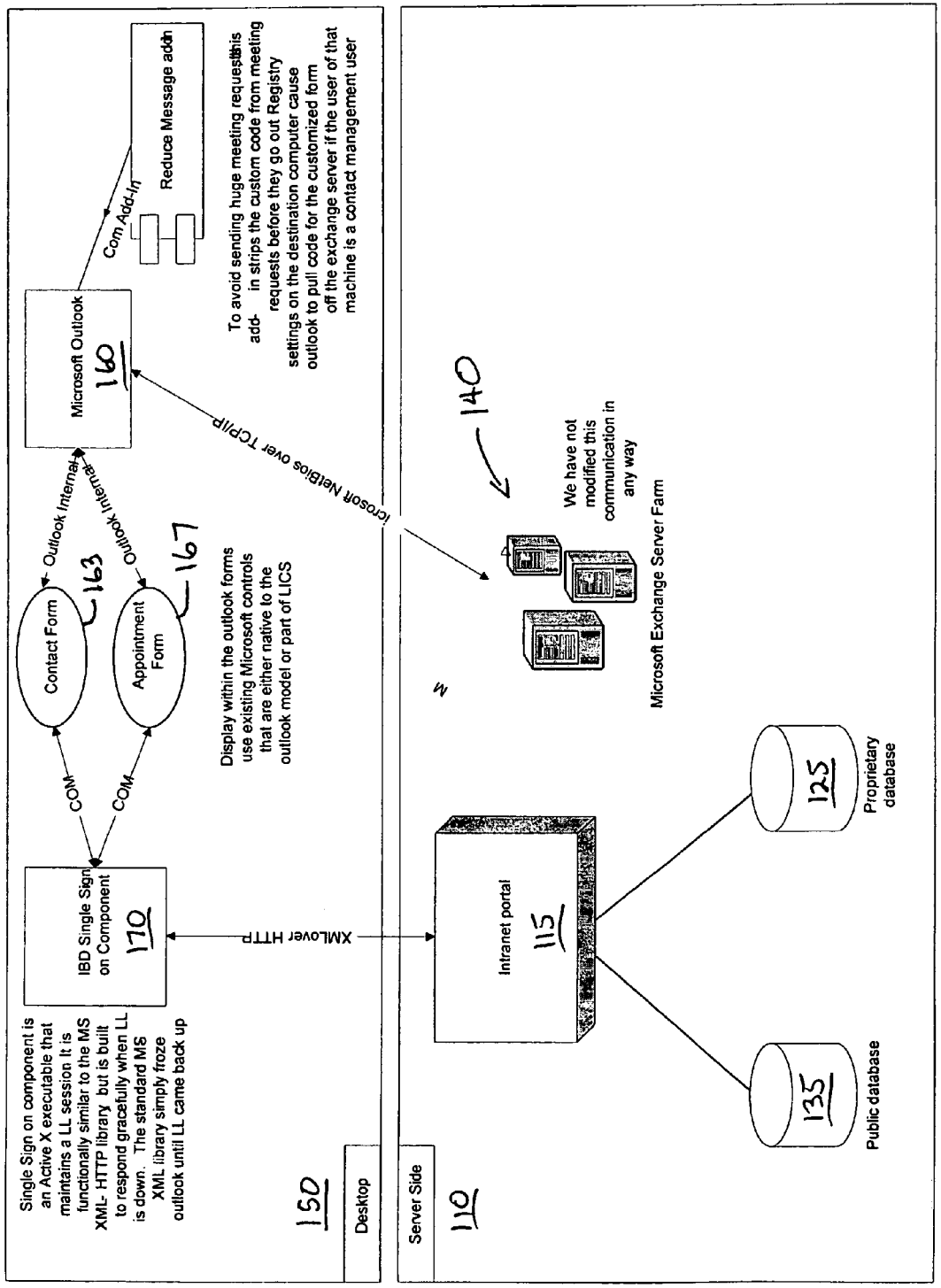
FIG. 1 is a schematic diagram of an architecture used in some embodiments of the present invention.

FIG. 1 is a schematic diagram of an architecture used in some embodiments of the present invention. FIG. 1 illustrates a client-server architecture having a server side 110 and a client side 150. On the client side 150, a client program component 160 enables the user to view and retrieve contact and calendar information and to request contact and calendar information. In a preferred embodiment, the client program component 160 is Outlook® available from Microsoft Corporation of Redmond, Wash. An advantage of using Outlook as the client side component is the customizable forms 163 167 that may be used with Outlook to display information relevant to the user. The custom forms may be stored on a network server and pushed to each client computer on the internal network when new or updated forms are released. Outlook provides a front-end for a Microsoft Exchange Server® 140 that provides database management services for client contact and user calendar information in addition to handling email services for the user.

The client side 150 is connected to the company's intranet portal 115 that provides enterprise-wide network services to the user. A single sign-on component 170 on the client workstation maintains a session with the intranet portal 115. In a preferred embodiment, the single sign-on component 170 may be an Active X executable that is functionally similar to the Microsoft XML-HTTP library but gracefully responds when the intranet portal 115 is down thereby allowing Outlook to continue functioning until the intranet portal 115 is recovered. The intranet portal 115 provides authentication services that allow the user to access one or more databases 125 135 that contain company and client information. The company and client information retrieved from databases 125 135 populate the customizable forms 163 167 when activated by the user in Outlook. In some embodiments, a customized contact form 163 is displayed when the user selects a new contact control in Outlook. Similarly, a customized appointment form 167 may be displayed when the user selects a new appointment control in Outlook.

The contact and calendar information in the CMS may be private, proprietary, or public. As used herein, a private contact or appointment is only viewable by the user and is not available to others. An example of a private contact may be the user's spouse or physician. An example of a private appointment may be an anniversary or doctor's appointment. As used herein, proprietary refers to company and client information that the company maintains and does not make available to the public. An example of a proprietary contact may be the clients of the company or the relationship employees of the company have with people in the client company. As used herein, public refers to information that is publicly available to the public. An example of public information may be the directors or officers of a company. Proprietary and public information may be provided as a network service and stored on the company's internal network in databases 125 and 135. Although FIG. 1 shows a proprietary database 125 separate from the public database 135, both may be logically viewed as a single database. The information stored in the public database may be collected manually from publicly available sources, but preferably from third party information providers.

In some embodiments, databases 125 and 135 are updated on demand or on a weekly basis. In a preferred embodiment, databases are updated whenever a user changes a contact or appointment or when a new contact or appointment is entered.

Figure 2:
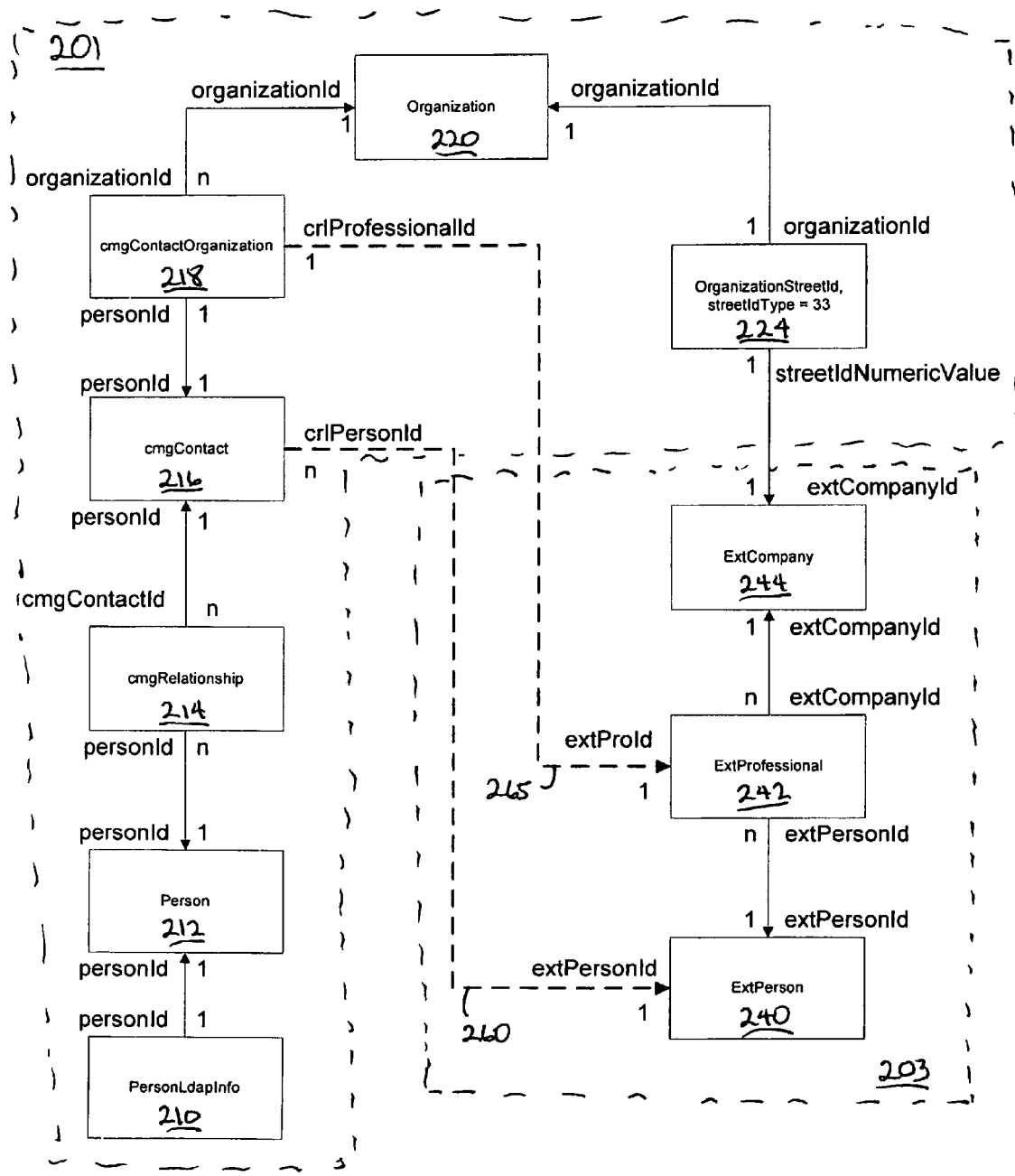
FIG. 2 is a schematic diagram of a database schema used in some embodiments of the present invention.

FIG. 2 is a schematic diagram of a database schema used in some embodiments of the present invention. In FIG. 2, both proprietary data 201 and public data 203 are shown. The proprietary data 201 may include an employee name 212 and their group affiliations 210 such as, for example, their P&L group, division, department, or other organizational units of the company. A contact is defined by the employee name 212, a client contact name 216, and a relationship type 214. A contact title 218 identifies the contact's relation to the client company. An organization table 220 contains a list of all client organizations of the company. Public data 203 may include an external person's name 240, the external person's company 244, and the external person's title or relationship 242 between the external person and the external person's company. An OrganizationStreet table 224 maintains a list of name pairs that correspond to the internal name of the client in the proprietary database and the external name of the client in the public database. The OrganizationStreet table 224 provides a translation of the internally used client name to the externally used client name without having to edit data in either the Organization table 220 or the ExtCompany table 244.

Links or shortcuts may be provided to reduce the number of searches. For example, a link 260 may be provided between the client contact table 216 and the external person table 240. Similarly, a link 265 may be provided between the contact title table 218 and the external person's title 244. The advantage of incorporating public data into the contact management system is shown in FIG. 2 by examining the mapping between the client contact name table 216 and the client name table 218, which indicates that a one-to-one mapping exists between the contact name table 216 and the client name table 218. The one-to-one mapping occurs because the employee initially meets the client contact in the context of specific transaction. The public data, however, may show that the client contact has more than one relationship with the client and may have relationships with other clients or potential clients. The employee may not be aware of these other relationships when he/she enters the new contact into the CMS.

Figure 3:
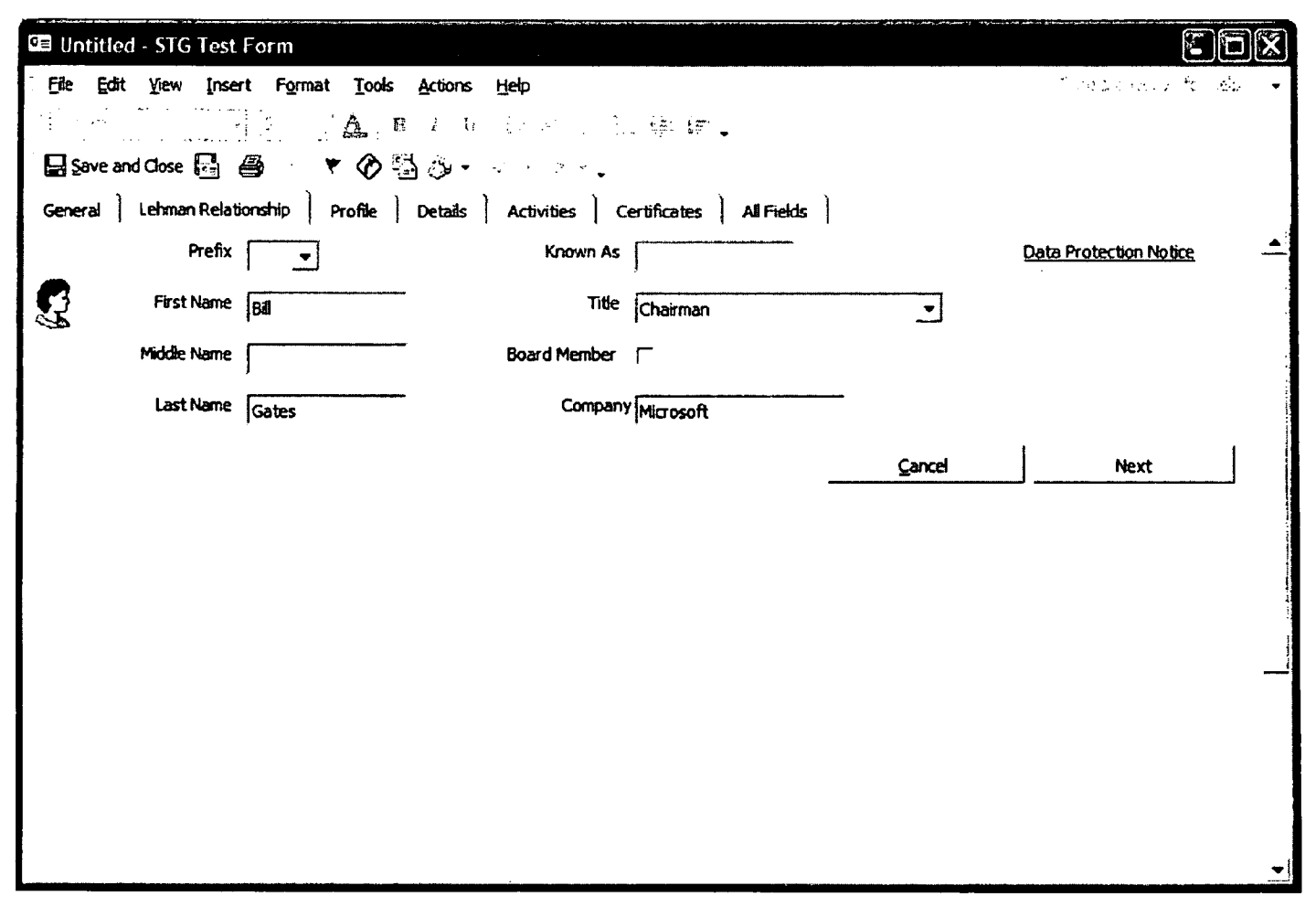

The process of creating a new contact is now described with reference to FIGS. 3-6. FIG. 3 is an illustrative screen shot of a custom contact form that is displayed by Outlook when a user selects a new contact control. Prior to the screen shown in FIG. 3, the user may specify that a link be created to the new contact. If the user specifies that a link to the new contact be created, the new contact information is stored in the proprietary database 125 and portions of the contact information will be available to other employees in the company. If the user specifies that no link should be created, the new contact information is considered private and is stored on the exchange server 140 that is only viewable by the user. The custom form shown in FIG. 3 displays fields where the user can enter the contact's name, title, and company. The form also includes a cancel control that, when selected, aborts the new contact process and a next control that, when selected, saves the entered data and displays the next screen to the user.

Figure 4:
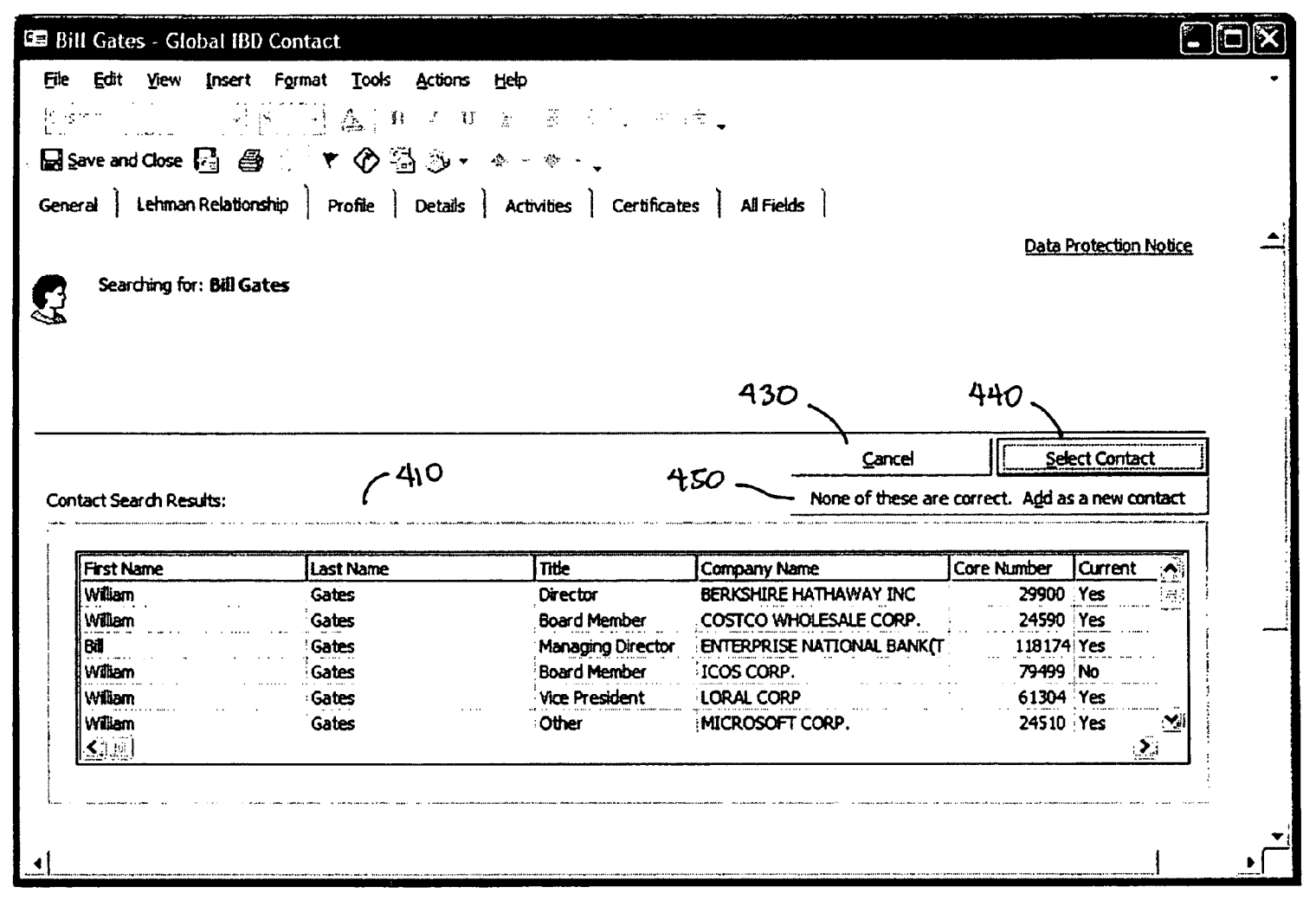

FIG. 4 is an illustrative screen shot of a custom contact form that is displayed when the user selects the continue control on the form shown in FIG. 3. FIG. 4 displays a table 410 containing the search results of the contact name in the public database. The table 410 is populated by a name-matching component that normalizes and compares the name entered by the user to the names in the public database. The search results may be scored to indicate the accuracy of the match and may be displayed by decreasing score. The user selects from the list the appropriate name and selects a select control 440 to create a link to the selected name in the public database. If the search returns a null, the user may select an add control 450 that adds the entered information as a new contact without establishing a link to the public database.

Figure 5:
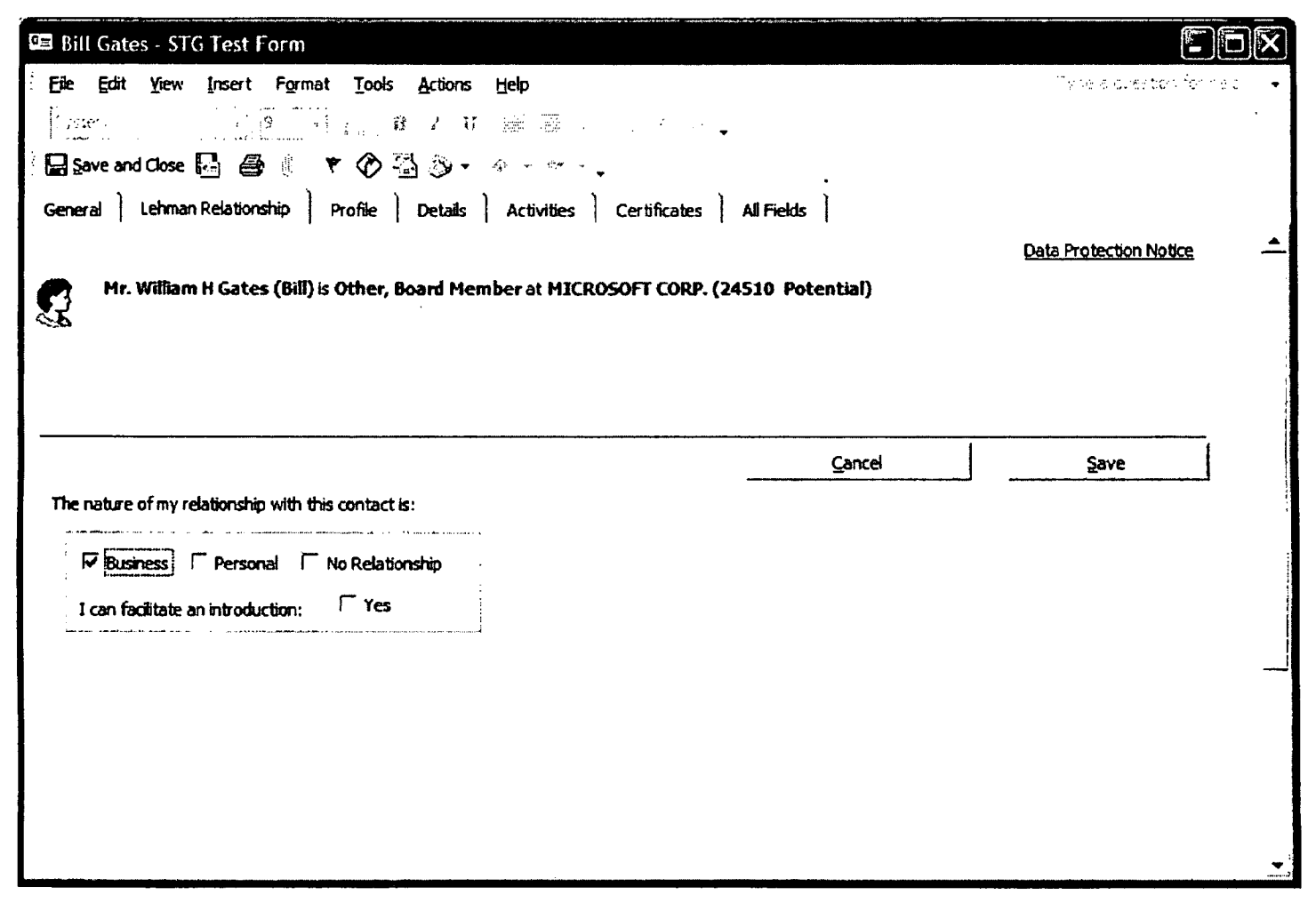

FIG. 5 is an illustrative screen shot of a custom contact form that is displayed when the user selects the select control 440 or the add control 450 on the form shown in FIG. 4. In the form shown in FIG. 5, the user is asked to characterize his relationship with the new contact and indicate if he is willing to facilitate an introduction to the new contact.

In a preferred embodiment, an inference may be made on whether the user may facilitate an introduction to the contact. The inference may be based on one or more characteristics of the user, the contact, and their previous contacts. Without being limiting, examples of such characteristics may include the user's role, meeting type, and contact title. In an exemplar scenario, if the user is the lead banker and has made two or more face-to-face meetings with the contact who is the CFO of the client company, an inference may be made that the user may be in a position to facilitate an introduction to the contact and the user may be presented automatically with an option to indicate his/her willingness to facilitate an introduction. The meeting type may also include social engagements retrieved from the user's calendar such as, for example, hosting the client at a Yankees game.

Figure 6:
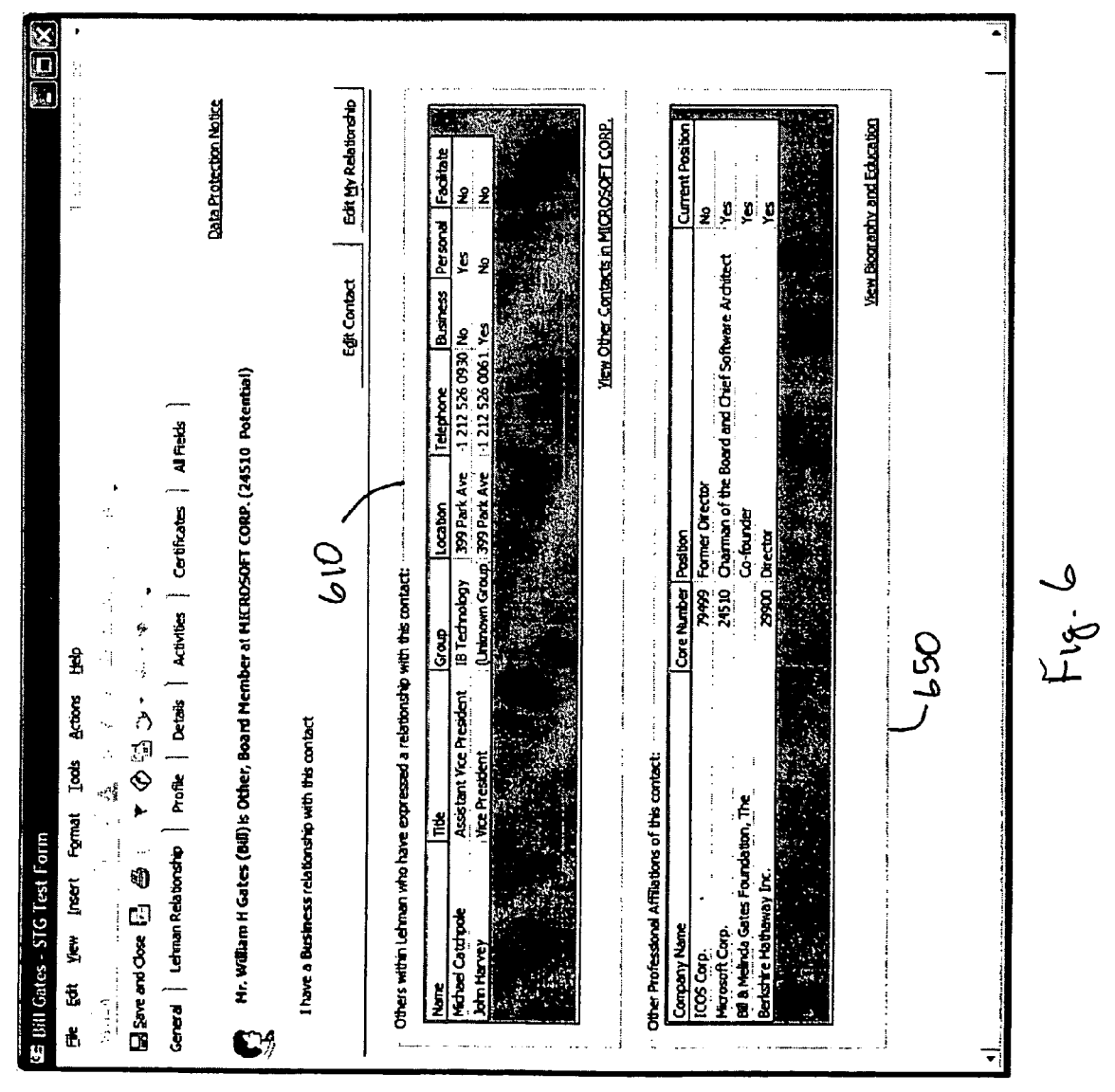

FIG. 6 is an illustrative screen shot of a custom contact form that is displayed when the user selects a save control 550 on the form shown in FIG. 5. In FIG. 6, two tables are displayed to the user. A first table 610 displays other employees of the company that have a relationship to the contact and is populated from the proprietary database. A second table 650 displays the other professional affiliations of the contact and is populated from the public database.

Figure 7:
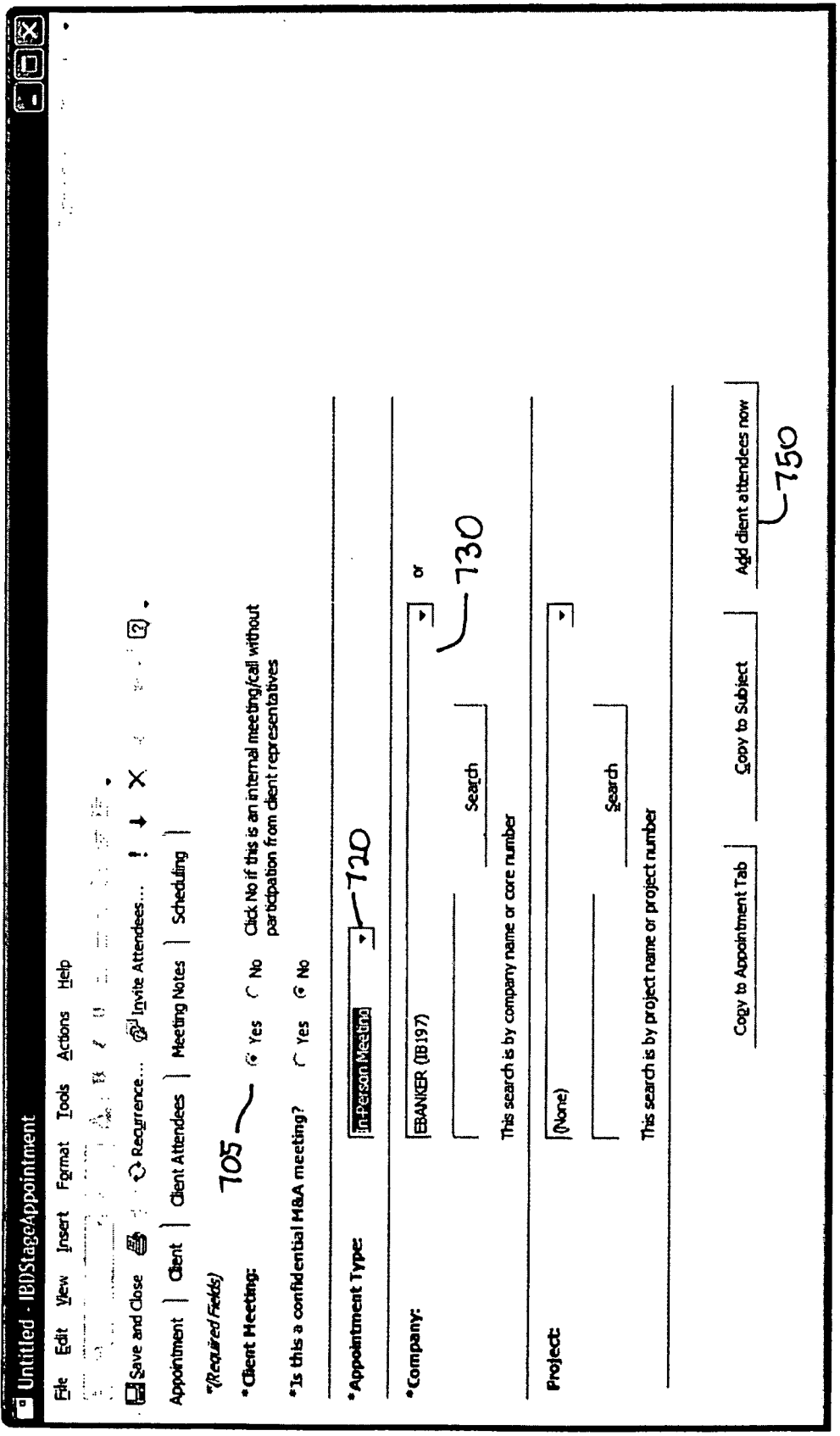
FIG. 7 is a screen shot of a custom appointment form used in some embodiments of the present invention.

FIG. 7 is an illustrative screen shot of a custom appointment form that is displayed when the user selects a new appointment control in Outlook. In FIG. 7, the user enters the required information about the appointment such as, for example, the appointment type 720, client company 730, and whether client representatives will attend 705. Client attendees may be added by selecting an Add-client-attendees control 750.

Figure 8:
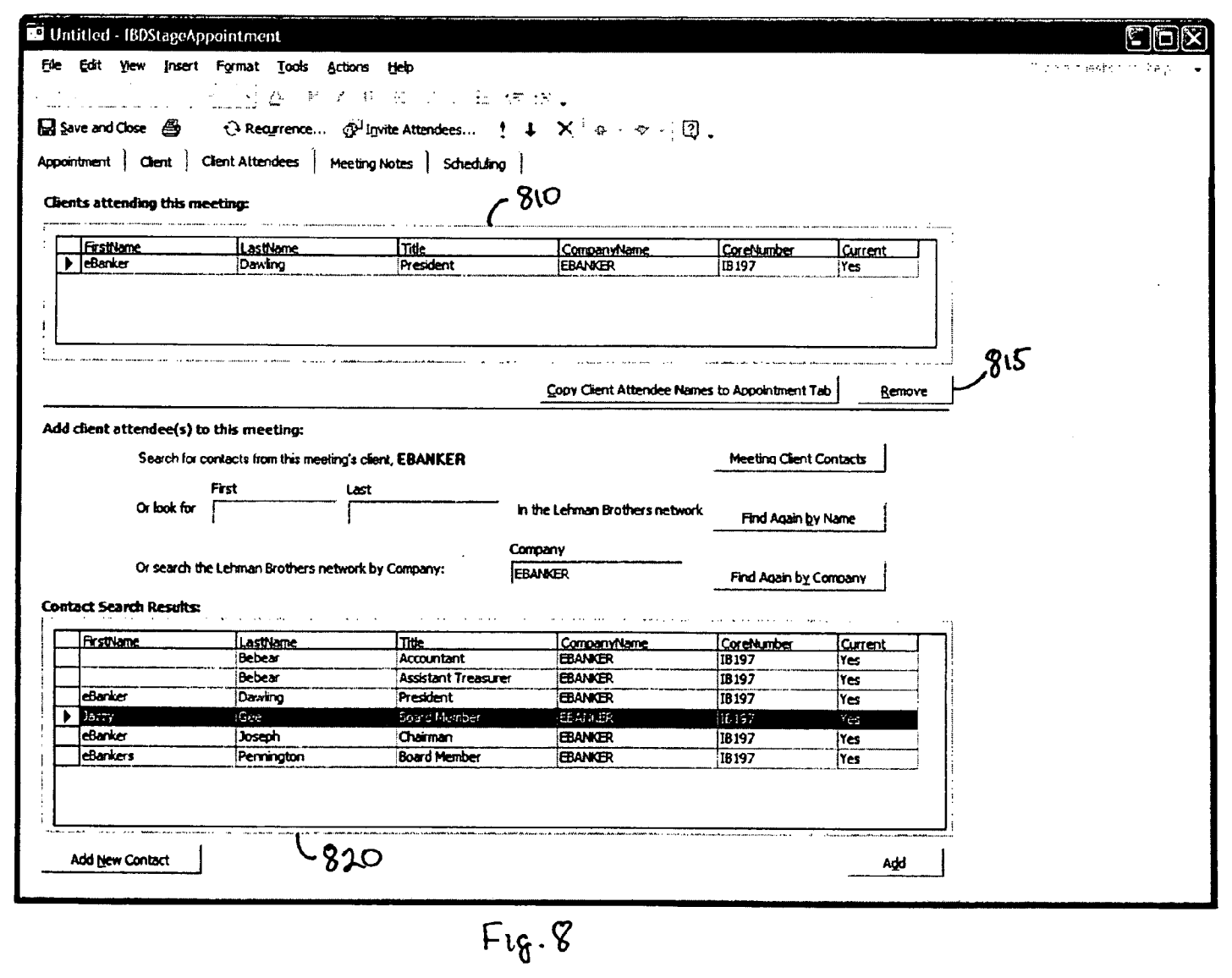

FIG. 8 is an illustrative screen shot of a custom appointment form that is displayed when the user selects the Add-client-attendees control 750 on the form shown in FIG. 7. In FIG. 8, an appointment table 810 lists the client attendees to the appointment. A client may be removed from the appointment list by selecting the client and selecting the Remove control 815. Clients may be entered by name or selected from a search results list 820. In the example shown in FIG. 8, the search results list is generated by a search of the proprietary database on a client company, EBANKER.

Recurring meetings may be created that allow for customization of a single meeting while maintaining historical details of previous meetings and links to future meetings. In prior art systems, a recurring meeting is stored as a single meeting with a repeat factor and frequency. This enables the storage of a potentially infinite number of meetings in a single meeting and thereby saves storage space. Storing a series of repeating meetings in a single recurring meeting, however, makes storing of the details of each meeting and the customization of a particular meeting difficult. In many cases, changing the details of a particular meeting affects past meetings and may even result in the loss of past meeting details.

In a preferred embodiment, a recurring meeting is linked to an object that contains the pattern of the recurring meeting. Such a pattern may include the repeat factor describing the number of repeats or whether the pattern continues indefinitely. The pattern may also include the repeat frequency such as, for example, weekly, monthly, or every other Tuesday. Each meeting generated from the pattern is stored as a distinct meeting in the user's calendar but maintains a link to the pattern. When the pattern is changed from, for example, every other Wednesday to the third Thursday of each month, the change is applied to the pattern but does not affect meetings in the past. The link between the past meetings and the pattern are unchanged so the historical details of previous meetings remain available to the participants of the recurring meetings. Furthermore, changes to the meeting attendees for future meetings may be made without changing the rosters of previous meetings.

Storage space requirements may be reduced by generating meetings for a predetermined future time period. For example, meetings from a recurring meeting pattern may be entered into the attendee's calendars only for the next three months. As each calendar is updated, the program component may insert a meeting from the meeting pattern such that each calendar has the next three months of recurring meetings. In some embodiments, the future time period may default to three months but the user may change the time period if, for example, the user is unusually busy and must keep his/her schedule fluid.

In a preferred embodiment, meeting details are captured by encouraging each participant to enter meeting details soon after the conclusion of each meeting. A software component automatically generates and sends an email reminder to at least one attendee of the meeting asking the attendee to enter the attendee's notes on the meeting. In other embodiments, only the meeting chair, or his/her designate, is sent a reminder to enter a synopsis of the meeting. The entered notes and synopsis are stored in the proprietary database with a link to the meeting.

A pre-meeting market alert may be generated and send by email to each participant of an upcoming meeting. In a preferred embodiment, a software component automatically pulls the latest market data and news of the client company the night before a scheduled meeting and sends the information by email to each participant. The histories of previous meetings with the client company may be included in the pre-meeting report.

A user may receive a monthly meeting summary report that is generated automatically by a software component. In a preferred embodiment, the summary report includes the number of meetings with each client and identifies clients that were not contacted during the previous month.

Figure 9:
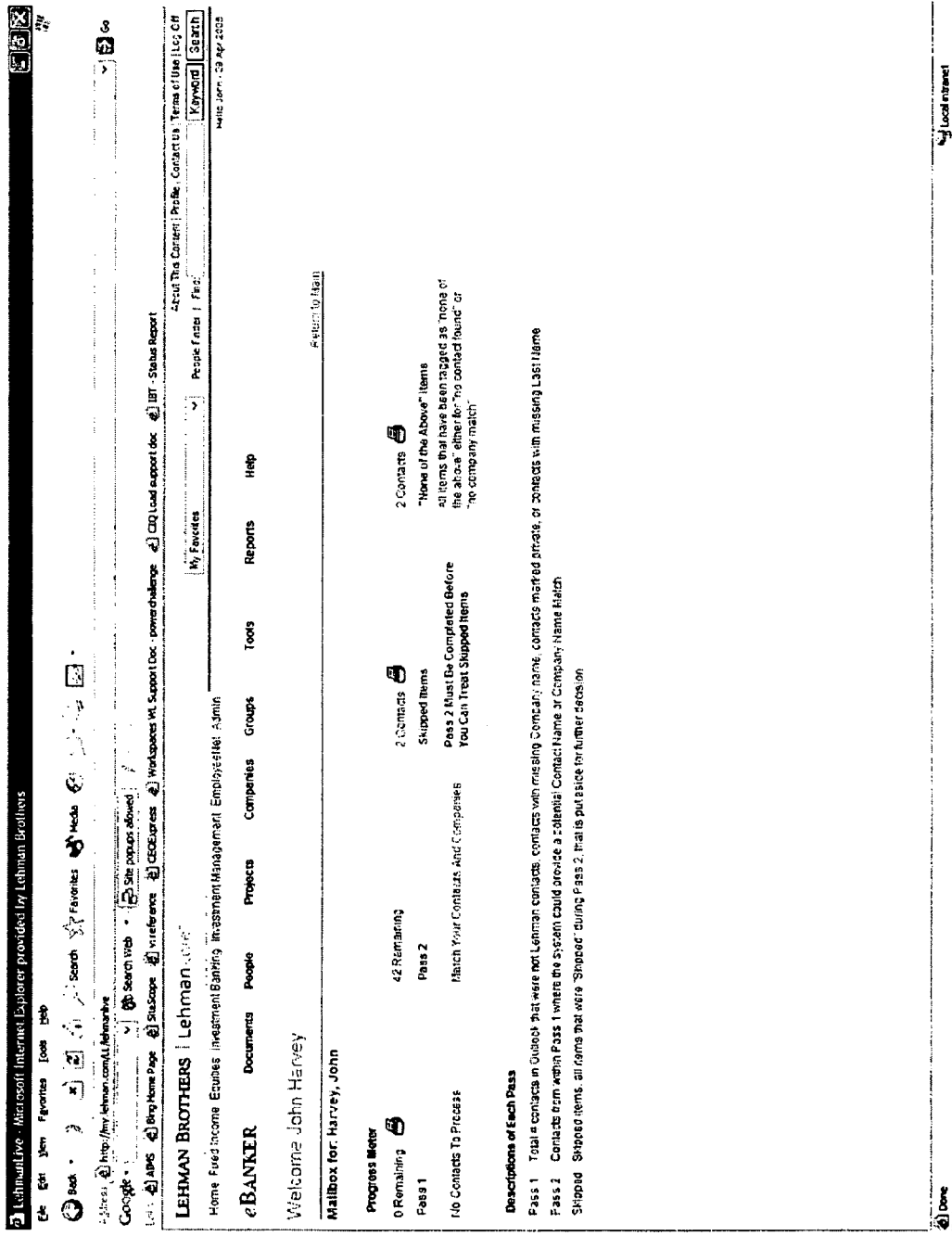
FIG. 9 is a screen shot of a conversion wizard used in some embodiments of the present invention.
Figure 10:
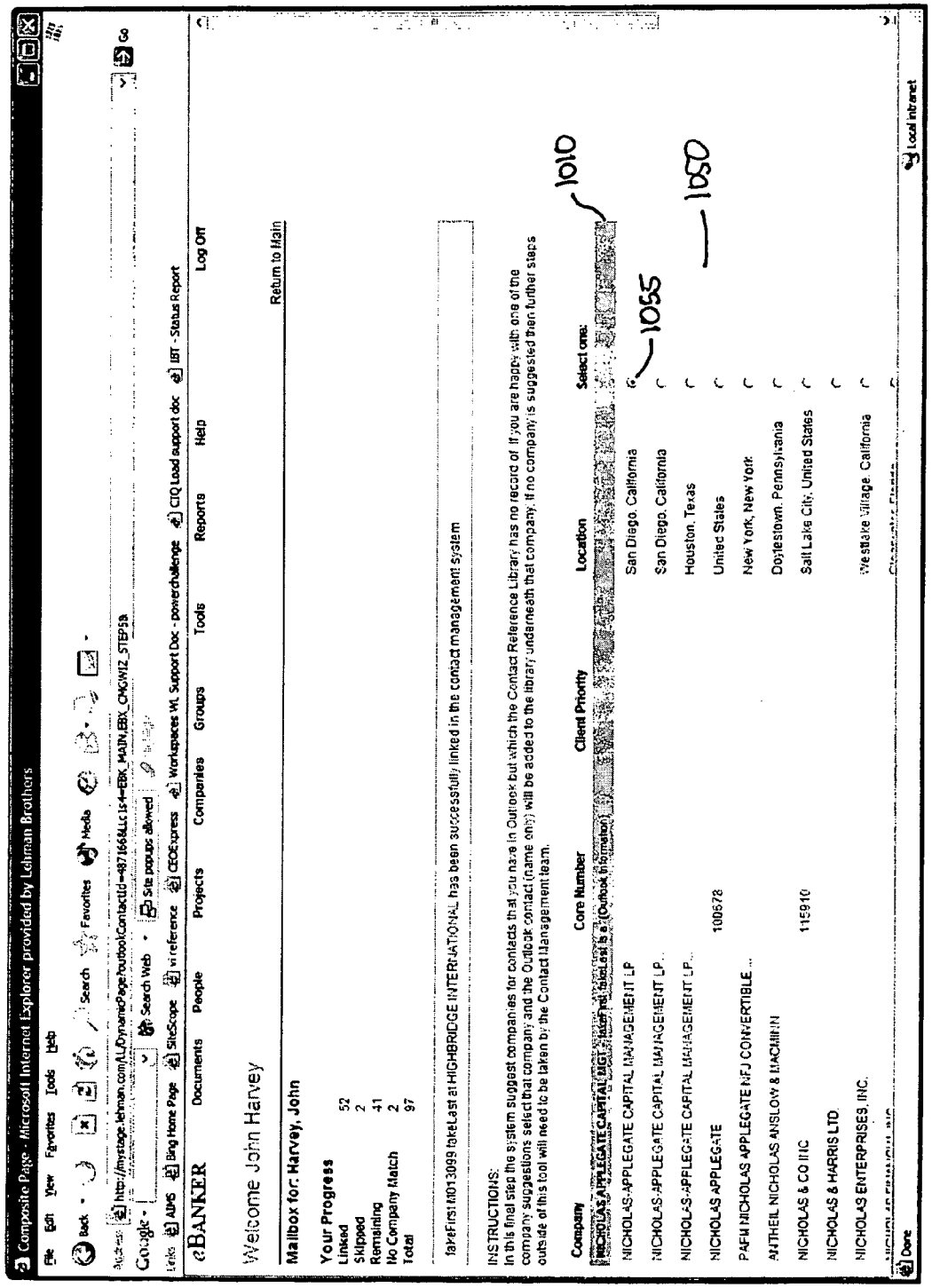
FIG. 10 is another screen shot of a conversion wizard used in some embodiments of the present invention.
Figure 11:
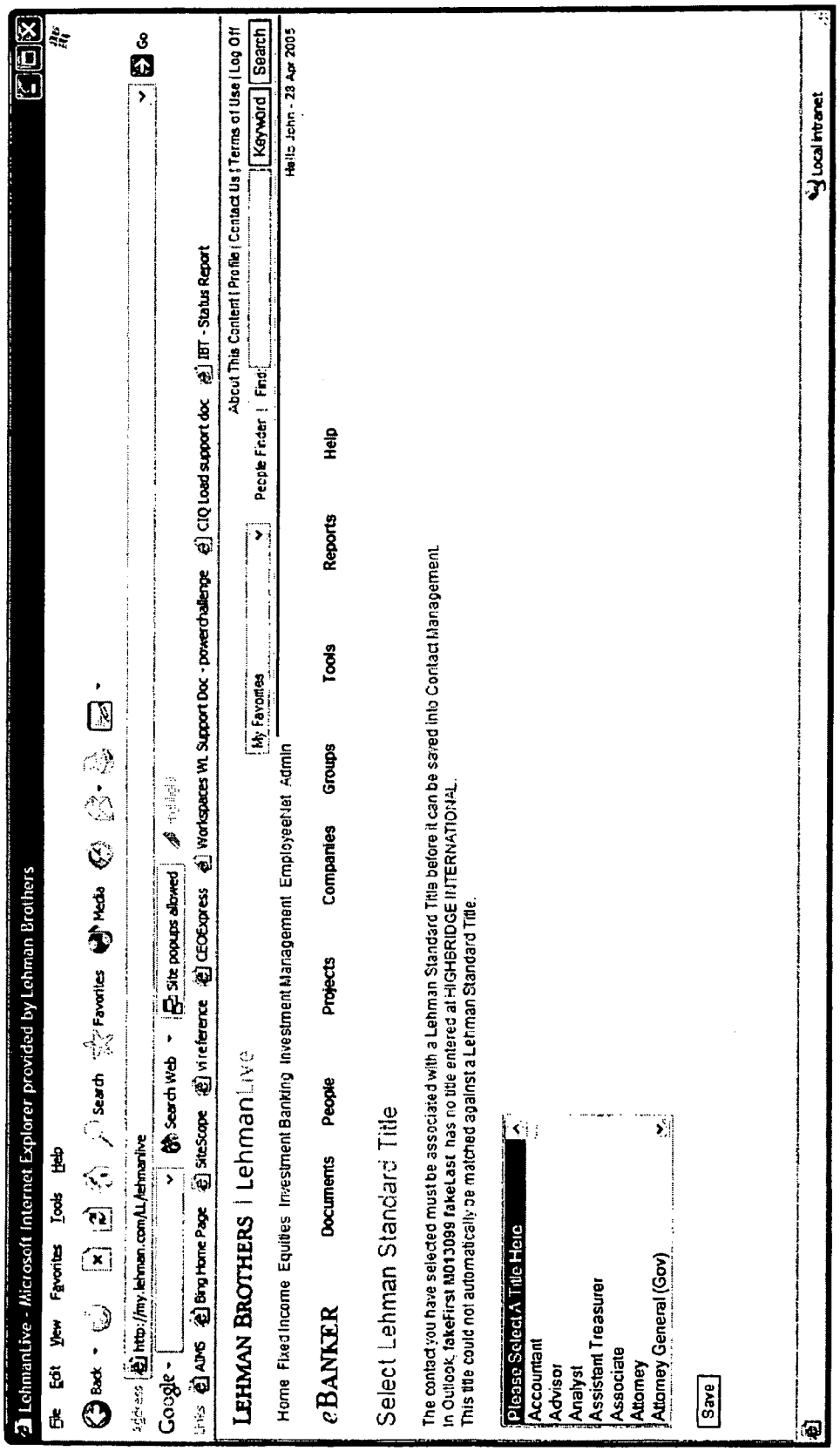
FIG. 11 is another screen shot of a conversion wizard used in some embodiments of the present invention.
Figure 12:
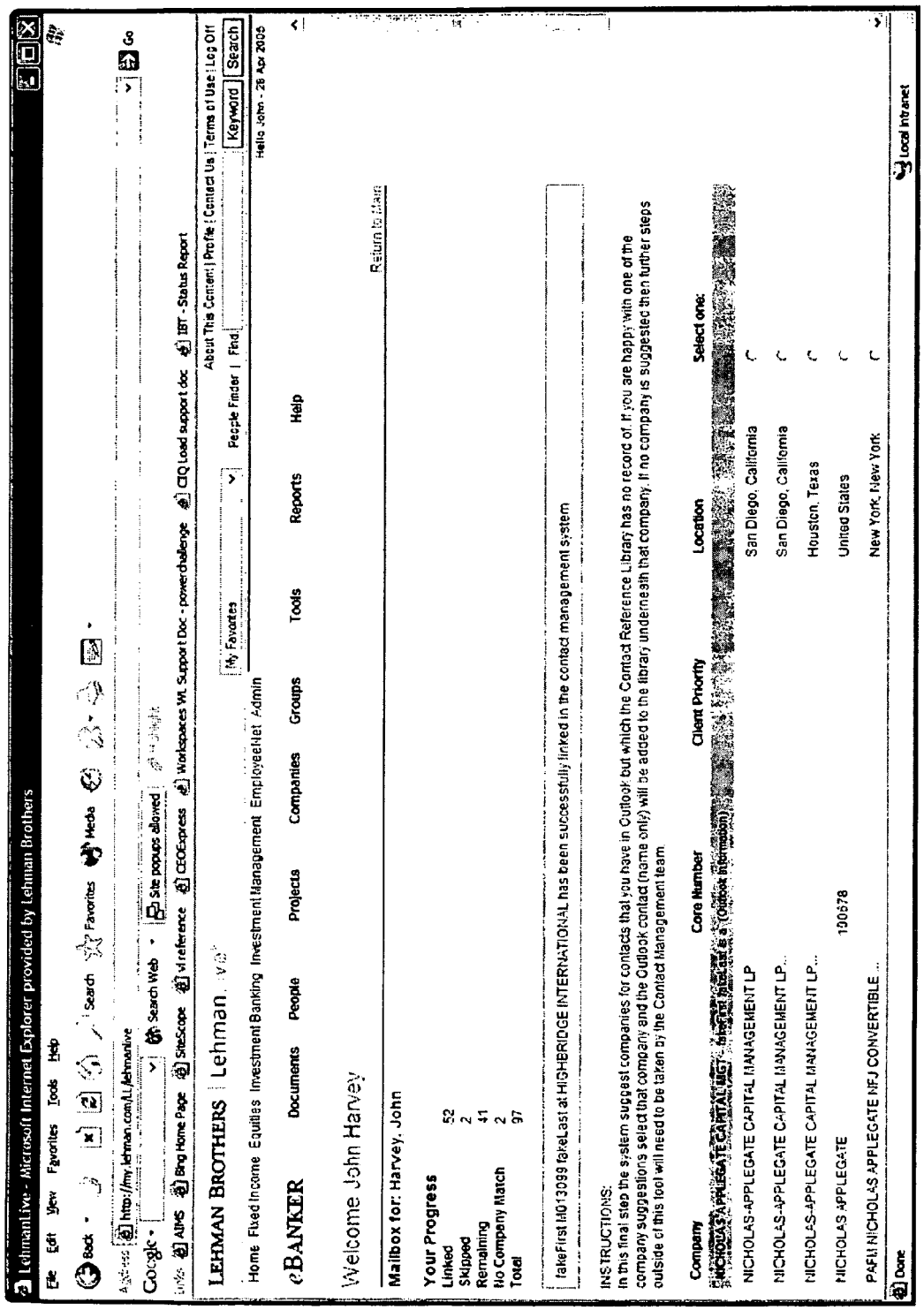
FIG. 12 is another screen shot of a conversion wizard used in some embodiments of the present invention.

FIGS. 9-12 illustrate a process of creating links to a pre-existing contact list. FIG. 9 is an illustrative screen shot during the process after a wizard has scanned the user's contact list and compared the user's contact list against the proprietary database to identify potential company contacts.

The web of contacts maintained by embodiments of the present invention may be used to generate and track executive referrals to clients. A user may sponsor or identify a person at a client company as a potential executive in a market space and enter the information with the person's contact information. For example, user A may identify person X as a potential CFO at a chemical processing company. User A enters the information in person X's contact information. If another chemical processing company that is a client of user B expresses a need for a CFO, user B can query the database for people identified as a potential CFO in the chemical processing space. The query will identify person X, the potential referral, and user A, the sponsor, so that user B can contact user A about the possibility of facilitating a introduction between person X and user B. If person X does become the CFO of user B's client, the information is stored in the proprietary database such that all referrals are tracked.

The description herein should be understood to describe only one preferred embodiment of the invention. Those skilled in the art will recognize that the described embodiment is just one example of the novel system and method for contact management that enables users to view contact information from both proprietary and publicly available data sources. The example is all that needs to be described in detail in order to enable the more general system and method that the invention comprises. Other embodiments will be apparent to those skilled in the art after reading the description provided herein.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A contact management system comprising:
   one or more memory units each operable to store at least one program; and
   at least one processor communicatively coupled to the one or more memory units, the at least one processor configured to execute the at least one program;
   a first database containing proprietary contact information;
   a second database containing public contact information;
   a contact component for receiving proprietary contact information from a user for storage in the first database and presenting contact information to the user, wherein the presented contact information includes information retrieved from the first database and the second database, said contact component providing one or more links between contact information in the first and second databases;
   a referral component that receives referral data from the user, the referral data identifying a person as a potential referral in the proprietary database and identifying the user as a sponsor, the referral data being stored in the proprietary database, wherein the referral component receives a query from another user, the referral component accesses the proprietary database, the referral component compares a contact list of the other user to the referral data in the proprietary database to identify the potential referral and the sponsor; and
   an appointment component for receiving meeting data from a user and presenting one or more meeting alerts to the user, wherein when the meeting data includes a link to a meeting pattern of a recurring meeting, the appointment component generates a future meeting entry from the meeting pattern when a future meeting pattern is selected and the future meeting entry falls within a predetermined future time period and automatically generates one or more next future meeting entries from the meeting pattern upon expiration of at least a portion of the predetermined future time period.

2. The system of claim 1, wherein the meeting data includes at least one of a list of attendees, a meeting time, a meeting date, and a client contact.

3. The system of claim 1, wherein the meeting pattern includes a repeat factor and a frequency.

4. The system of claim 1, wherein the appointment component further comprises an alert component, the alert component configured to retrieve current information about a contact and send the retrieved information to a meeting attendee prior to the meeting.

5. The system of claim 4, wherein the current information includes a most recent market data of the contact.

6. The system of claim 4, wherein the current information includes news about the contact.

7. The system of claim 4, wherein the retrieved information is sent to the attendee by email.

8. The system of claim 4, wherein a history of previous meetings with the contact is included in the sent information.

9. The system of claim 1, wherein the appointment component further comprises a synopsis component, the synopsis component configured to send a reminder to a meeting attendee after a scheduled end of a meeting, the reminder prompting the attendee to enter a synopsis of the meeting, the synopsis stored by the synopsis component.

10. The system of claim 1, wherein the appointment component further comprises a summary component, the summary component configured to generate a report for the user, the generated report indicating a number of meetings with one or more of the user's contacts over a time period.

11. The system of claim 1, wherein the contact component further comprises an inference component, the inference component configured to prompt the user to facilitate an introduction to the user's contact based on a predetermined rule.

12. The system of claim 11, wherein the predetermined rule depends on at least one of a user's role, a contact title, and a meeting type.

13. The system of claim 1 further comprising:
    a referral component for receiving referral data from a user, presenting one or more potential referrals and tracking referrals made by the user.

14. A method comprising the steps of:
    retrieving proprietary contact information from a first database;
    retrieving public contact information from a second database;
    presenting to a user contact information comprising the proprietary contact information and the public contact information;
    providing one or more links between contact information in the first and second databases;
    receiving referral data from the user, the referral data identifying a person as a potential referral in the first database and identifying the user as a sponsor;
    receiving a query from another user;
    accessing the first database;
    comparing a contact list of the other user to the referral data in the first database to identify the potential referral and the sponsor;
    receiving meeting data from a user; and
    when the meeting data includes a link to a meeting pattern of a recurring meeting, generating a future meeting entry from the meeting pattern when the future meeting entry falls within a predetermined future time period and automatically generating one or more next future meeting entries from the meeting pattern upon expiration of at least a portion of the predetermined future time period.

15. The method of claim 14 further comprising:
    retrieving current information about a contact; and
    sending a meeting alert including to the user prior to the meeting, the meeting alert presenting the retrieved current information about the contact.

16. The method of claim 15 further comprising:
    generating a report for the user, the generated report indicating a number of meetings with one or more of the user's contacts over a time period; and
    presenting the generated report to the user.

17. The method of claim 15, wherein the meeting alert further includes a history of previous meetings with the contact.

18. The method of claim 15 further comprising:
prompting the user to enter a synopsis of the meeting after a scheduled end of the meeting; and
storing the synopsis in the first database.

19. The method of claim 15, further comprising presenting to the user one or more potential referrals, each of the one or more of potential referrals identifying a sponsor that can facilitate an introduction between the user and the potential referral.

20. The method of claim 14 further comprising:
receiving a new contact information from the user;
storing the new contact information in the first database; and
prompting the user to indicate whether the user can facilitate an introduction to the new contact after inferring that the user can facilitate an introduction to the new contact.

21. A method comprising the steps of:
requesting contact information of a contact;
viewing the requested information, wherein the requested information includes proprietary information retrieved from a proprietary database and public information retrieved from a public database;
providing one or more links between contact information in the proprietary and public databases;
receiving referral data from the user, the referral data identifying a person as a potential referral in the first database and identifying the user as a sponsor;
receiving a query from another user;
accessing the first database;
comparing a contact list of the other user to the referral data in the first database to identify the potential referral and the sponsor;
sending meeting data to an appointment module; and
when the meeting data includes a link to a meeting pattern of a recurring meeting, receiving, for insertion into a calendar of an attendee, a future meeting entry from the appointment module that is generated from the meeting pattern when the future meeting entry falls within a predetermined future time period, and the appointment component automatically generates one or more next future meeting entries from the meeting pattern upon expiration of at least a portion of the predetermined future time period.

22. The method of claim 21 further comprising:
entering contact information of a new contact; and
indicating, in response to a prompt, a willingness to facilitate an introduction to the new contact.

23. The method of claim 21 further comprising:
receiving a meeting alert for a meeting with the contact at a future date, the alert including current information about the contact.

24. The method of claim 23 further comprising:
receiving a report indicating a number of meetings with one or more of a user's contacts over a time period.

25. The method of claim 23, wherein the meeting alert further includes a history of previous meetings with the contact.

26. The method of claim 21 further comprising:
receiving a request to enter a synopsis of a recently finished meeting; and
entering a synopsis of the recently finished meeting.

27. The method of claim 21 further comprising:
requesting a potential referral for a contact;
reviewing the potential referral and a sponsor associated with the potential referral; and
contacting the sponsor to request an introduction to the potential referral.

28. The system of claim 1, wherein the appointment component further receives a change to the meeting pattern, wherein said appointment system applies the change to said meeting pattern without affecting past meeting entries of the meeting pattern.

29. The system of claim 28, wherein the appointment component applies the change to the meeting pattern without affecting a link between the past meeting entries and the meeting pattern.

30. The system of claim 1, wherein the meeting data comprises a roster of attendees, wherein the appointment component further receives a change to a roster of attendees for future meeting entries of the meeting pattern, and applies the change to the roster of attendees for future meeting entries without affecting a roster of attendees for past meeting entries of the meeting pattern.

31. The system of claim 1, wherein the referral component presents a list of potential referrals and sponsors in response to the query to the other user.

\* \* \* \* \*